United States Patent
Stark et al.

(10) Patent No.: US 11,428,097 B2
(45) Date of Patent: Aug. 30, 2022

(54) WELLBORE DISTRIBUTED SENSING USING FIBER OPTIC ROTARY JOINT

(71) Applicant: Halliburton Energy Services, Inc., Houston, TX (US)

(72) Inventors: Daniel Joshua Stark, Houston, TX (US); John L. Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 313 days.

(21) Appl. No.: 16/628,800

(22) PCT Filed: Feb. 11, 2019

(86) PCT No.: PCT/US2019/017505
§ 371 (c)(1),
(2) Date: Jan. 6, 2020

(87) PCT Pub. No.: WO2020/167285
PCT Pub. Date: Aug. 20, 2020

(65) Prior Publication Data
US 2021/0032985 A1 Feb. 4, 2021

(51) Int. Cl.
*E21B 47/135* (2012.01)
*E21B 23/14* (2006.01)
(Continued)

(52) U.S. Cl.
CPC ............ *E21B 47/135* (2020.05); *E21B 23/14* (2013.01); *E21B 47/01* (2013.01); *G01V 8/16* (2013.01)

(58) Field of Classification Search
CPC .......... E21B 23/14; E21B 47/01; E21B 47/07; E21B 47/135; G01V 8/16
See application file for complete search history.

(56) References Cited

U.S. PATENT DOCUMENTS 5,588,077 A * 12/1996 Woodside ................ G02B 6/32
385/16
5,992,250 A * 11/1999 Kluth ...................... E21B 47/12
73/866.5

(Continued)

FOREIGN PATENT DOCUMENTS

CN 106884647 A * 6/2017
WO WO-9827406 A1 * 6/1998 ......... G01D 5/35364

(Continued)

OTHER PUBLICATIONS

Zhou et al. "Distributed Temperature and Strain Discrimination with Stimulated Brillouin Scattering and Rayleigh Backscatter in an Optical Fiber," Sensors 2013, 13, 1836-1845 (Year: 2013).*

(Continued)

*Primary Examiner* — John Fitzgerald
(74) *Attorney, Agent, or Firm* — Kilpatrick Townsend & Stockton LLP (57) ABSTRACT

A system includes an optical fiber integrated into a conveyance subsystem that is positionable downhole in a wellbore. The system also includes a backscattering sensor system positionable to monitor temperature and optical fiber strain along the optical fiber using backscattered light signals received from the optical fiber. Further, the system includes a fiber optic rotary joint positionable to optically couple the optical fiber with the backscattering sensor system to provide an optical path for the backscattered light signals to reach the backscattering sensor system.

19 Claims, 9 Drawing Sheets

(51) Int. Cl.
*E21B 47/01* (2012.01)
*G01V 8/16* (2006.01)

(56) References Cited

U.S. PATENT DOCUMENTS

| | | | |
|---|---|---|---|
| 6,285,446 B1* | 9/2001 | Farhadiroushan | G01D 5/35383 356/35.5 |
| 6,380,534 B1* | 4/2002 | Farhadiroushan | G01D 5/35364 250/227.14 |
| 6,532,839 B1* | 3/2003 | Kluth | E21B 23/08 73/866.5 |
| 6,668,139 B2* | 12/2003 | Meli | H04J 14/0205 398/173 |
| 7,617,873 B2 | 11/2009 | Lovell et al. | |
| 7,900,699 B2 | 3/2011 | Ramos et al. | |
| 8,326,540 B2* | 12/2012 | Hull | E21B 47/103 702/8 |
| 8,681,322 B2* | 3/2014 | Barry | G01S 17/88 356/3.01 |
| 9,557,196 B2* | 1/2017 | Xue | G01K 11/32 |
| 9,557,231 B2* | 1/2017 | Villiger | G01K 1/14 |
| 9,611,734 B2* | 4/2017 | Barfoot | E21B 47/135 |
| 9,708,867 B2* | 7/2017 | Lovell | E21B 23/12 |
| 9,823,098 B2* | 11/2017 | Bastianini | G01D 5/35303 |
| 10,073,222 B2* | 9/2018 | Jaaskelainen | G02B 6/32 |
| 10,209,138 B2* | 2/2019 | Cedilnik | G01K 11/32 |
| 10,316,641 B2* | 6/2019 | Constantinou | E21B 47/00 |
| 10,317,197 B2* | 6/2019 | Ramachandran | A61B 5/1076 |
| 10,494,914 B2* | 12/2019 | Johnston | E21B 47/07 |
| 10,815,739 B2* | 10/2020 | Lovell | E21B 34/066 |
| 2003/0172752 A1 | 9/2003 | Kluth et al. | |
| 2008/0204703 A1 | 8/2008 | Hernandezs-Solis et al. | |
| 2011/0019178 A1* | 1/2011 | Vlatas | G01B 11/18 356/32 |
| 2011/0090496 A1* | 4/2011 | Samson | E21B 47/135 356/301 |
| 2011/0228255 A1* | 9/2011 | Li | G01B 11/18 356/32 |
| 2014/0056553 A1* | 2/2014 | Villiger | G01L 11/025 385/12 |
| 2014/0347192 A1* | 11/2014 | Barfoot | E21B 47/135 340/854.7 |
| 2015/0124264 A1* | 5/2015 | Ramachandran | A61B 5/1076 356/601 |
| 2016/0054186 A1* | 2/2016 | Froggatt | G01D 5/35306 73/800 |
| 2016/0209598 A1* | 7/2016 | Jaaskelainen | G02B 6/02042 |
| 2016/0251957 A1* | 9/2016 | McEwen-King | E21B 47/06 73/152.39 |
| 2016/0265905 A1 | 9/2016 | Duncan et al. | |
| 2017/0003177 A1* | 1/2017 | Cedilnik | G01K 11/32 |
| 2017/0096892 A1* | 4/2017 | Segura Dominguez | G02B 6/50 |
| 2017/0108358 A1* | 4/2017 | Bastianini | G01N 21/636 |
| 2017/0219736 A1 | 8/2017 | Bhongale et al. | |
| 2017/0284187 A1 | 10/2017 | Constantinou et al. | |
| 2017/0314341 A1* | 11/2017 | Lovell | E21B 47/135 |
| 2018/0003551 A1* | 1/2018 | Huignard | G01D 5/268 |
| 2018/0073356 A1* | 3/2018 | Hassig Fonseca | H04B 10/25 |
| 2018/0223647 A1* | 8/2018 | Johnston | E21B 47/113 |
| 2020/0173274 A1* | 6/2020 | Seabrook | E21B 47/103 |
| 2020/0263537 A1* | 8/2020 | Boone | G01V 1/226 |

FOREIGN PATENT DOCUMENTS

| | | |
|---|---|---|
| WO | 2004020790 | 3/2004 |
| WO | 2017109467 | 6/2017 |

OTHER PUBLICATIONS

Zhang et al. "Performance of temperature and strain simultaneous measurement system based on heterodyne detection of Brillouin scattering," IEEE Xplore (Year: 2008).*

Zhu et al. "Research on COTDR for Measuring Distributed Temperature and Strain," IEEE Xplore (Year: 2011).*

Miah et al. A Review of Hybrid Fiber-Optic Distributed Simultaneous Vibration and Temperature Sensing Technology and Its Geophysical Applications, Sensors 2017, 17, 2511 (Year: 2017).*

Liaw et al. "Hybrid Fiber-Optic Sensing Integrating Brillouin Optical Time-Domain Analysis and Fiber Bragg Grating for Long-Range Two-Parameter Measurement," Sensors 2021, 21, 4224 (Year: 2021).*

International Application No. PCT/US2019/017505, International Search Report and Written Opinion, dated Nov. 11, 2019, 11 pages.

* cited by examiner

WELLBORE DISTRIBUTED SENSING USING FIBER OPTIC ROTARY JOINT

TECHNICAL FIELD

The present disclosure relates generally to a system and method for performing a distributed sensing operation within a wellbore. More specifically, though not exclusively, the present disclosure relates to systems and methods that perform the distributed sensing operation within the wellbore using a fiber optic rotary joint.

BACKGROUND

Existing coiled tubing, wireline, or slickline operations performed in an oil and gas well environment may offer fiber optic sensing technology for measuring wellbore parameters using Raman and Rayleigh backscattering processes. However, due to excess signal power loss and limited sensitivity to absolute strain in Raman and Rayleigh backscattered light return signals, the existing fiber optic sensing technology bypasses use of a fiber optic rotary joint within a reel assembly that stores the coiled tubing, wireline, or slickline. Because the fiber optic rotary joint is bypassed, the coiled tubing, wireline, or slickline—including the optical fiber— must be fully deployed and a lockout-tagout (LOTO) procedure must be completed prior to creating a physical connection between the optical fiber and an optical fiber interrogator capable of receiving the backscattered light signals. Further, the Raman and Rayleigh backscattering processes may be limited to performing accurate measurements for optical fibers extending up to a maximum of 10 km in length.

Providing the physical connection between the optical fiber within the coiled tubing, wireline, or slickline and the interrogator may add excessive labor and time costs to a distributed temperature sensing process. Additionally, the physical connection limits acquisition of data to when the system is stationary (e.g., data cannot be collected while running into or out of a wellbore). Further, performing Raman or Rayleigh backscattering operations through the fiber optical rotary joint may introduce significant losses to the backscattered light signals. These significant losses may result in a reduction in temperature resolution and accuracy over a length of the optical fiber within a wellbore.

DETAILED DESCRIPTION

Certain aspects and examples of the disclosure relate to monitoring wellbore temperature and optical fiber strain along an optical fiber installed within a wellbore. Light backscatters in the optical fiber due to a variety of effects, such as elastic scattering (e.g., Rayleigh scattering), inelastic photon scattering (e.g., Raman scattering), and interaction with a crystalline lattice wave (e.g., Brillouin scattering). Each of these backscattered light signals have distinctive spectral attributes (e.g., frequency shifts or peak amplitude shifts) related to the temperature and strain locally at the scattering event. These local variations in the optical fiber may be measured by transmitting light signals into the optical fiber and detecting backscattered light resulting from each location. In some examples, the backscattered light signals may return to an interrogator or other light signal measurement device through a fiber optic rotary joint. The fiber optic rotary joint may be attached to a reel storing the optical fiber or a coiled tubing, wireline, or slickline that contains the optical fiber. Further, the fiber optic rotary joint may maintain optical communication between the optical fiber and the interrogator or other light signal measurement device even while the optical fiber is deployed within the wellbore.

For example, the optical fiber described herein may be placed within a length of coiled tubing or within a length of wireline or slickline. The optical fiber may be used to monitor temperatures along a length of a wellbore in which the optical fiber is deployed. In using a Brillouin backscatter strain and temperature sensing technique, a backscattered light signal returned to a surface of the wellbore may be strong enough for a Brillouin optical time domain sensor (BOTDS) system, which may include a Brillouin optical time domain reflectometer (BOTDR) or analyzer (BOTDA), to measure the backscattered light signal through a fiber optic rotary joint (FORM) coupled to a coiled tubing, wireline, or slickline reel. The reel, which stores excess coiled tubing, wireline, or slickline, rotates to run the coiled tubing, wireline, or slickline into or out of the wellbore. The FORJ may optically couple an uphole end of the optical fiber with the BOTDS system such that the BOTDS system is able to measure optical fiber strain and temperature along a length of the optical fiber within the wellbore even during rotation of the reel. For example, the FORJ may provide an optical path for backscattered light signals to reach the BOTDS system from the optical fiber.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
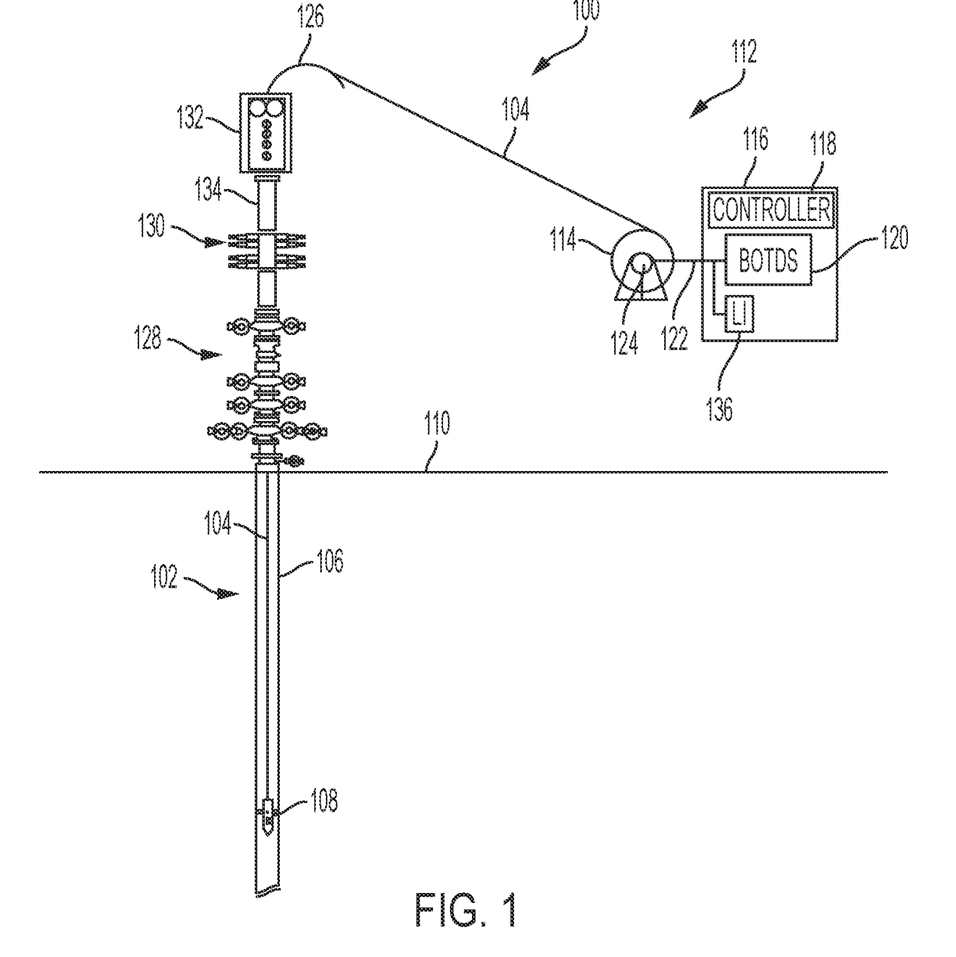
FIG. 1 is a cross-sectional schematic view of an example of a wellbore environment according to some aspects of the present disclosure.

FIG. 1 is a cross-sectional schematic view of an example of a wellbore environment 100. During a downhole operation within a well 102, a conveyance subsystem 104, which includes an optical fiber disposed within the conveyance subsystem 104, may be deployed within a wellbore 106. In an example, the conveyance subsystem 104 may include coiled tubing, a wireline, or a slickline. In an example, the downhole operation may include a wellbore stimulation operation (e.g., hydraulic fracturing), and a downhole end of the conveyance subsystem 104 (e.g., coiled tubing) may include a wellbore stimulation tool 108, During other operations within the well 102, the conveyance subsystem 104 may be a wireline or a slickline. The wireline or slickline may also include an optical fiber disposed within the wireline or slickline. Further, the coiled tubing, wireline, or slickline may provide power, control, communication lines, or a combination thereof from a surface 110 of the wellbore environment 100 to a downhole tool located at a downhole end of the coiled tubing, wireline, or slickline (e.g., a wireline logging tool, a perforating tool, a wellbore completion tool, a telemetry tool, etc. in place of the illustrated wellbore stimulation tool 108). In an example, the optical fiber may be a single mode optical fiber or a multimode optical fiber. In one or more examples, multiple optical fibers may be included in the conveyance subsystem 104. Further, in an example, a single optical fiber can be used for communication and logging.

As illustrated, the wellbore stimulation tool 108, or any other downhole tool, is coupled to the downhole end of the conveyance subsystem 104. The conveyance subsystem 104 may be deployed with the wellbore stimulation tool 108 into the wellbore 106 using a deployment system 112. In an example, the deployment system 112 may include a reel 114 that stores unused portions of the conveyance subsystem 104 and turns to inject or retract the conveyance subsystem 104 within the wellbore 106. The deployment system 112 may also include a surface equipment cabin 116. The surface equipment cabin 116 may include a controller 118 that controls operation of the deployment system 112 (e.g., raising and lowering the conveyance subsystem 104, controlling downhole operations within the wellbore 106, etc.). A Brillouin optical time domain sensor (BOTDS) system 120 may also be positioned within the surface equipment cabin 116 or elsewhere at the surface 110 of the wellbore environment 100.

The BOTDS system 120 may be optically coupled to an optical fiber 122 disposed outside the conveyance subsystem 104, and the optical fiber 122 may be optically coupled to a fiber optic rotary joint (FORD) 124 at the reel 114. The FORJ 124 may provide an optical coupling between the optical fiber 122 and the optical fiber disposed within the conveyance subsystem 104. The FORJ 124 may maintain the optical coupling even during rotation of the reel 114 to inject or retract the conveyance subsystem 104 into or from the wellbore 106, For example, the FORJ 124 may provide an optical path for backscattered light signals to reach the BOTDS system 120 from the optical fiber 122. Accordingly, measurements can be made by the BOTDS system 120 without connecting and disconnecting the optical fiber 122 between rotational movement of the reel 114. Further, the BOTDS system 120 may take measurements while the wellbore stimulation tool 108, or any other downhole tool, performs downhole operations.

In operation, the BOTDS system 120 may transmit a series of short and powerful light bursts into the optical fiber 122. The FORJ 124 provides an optical coupling between the optical fiber 122 and the optical fiber within the conveyance subsystem 104. In this manner, the light bursts from the BOTDS system 120 are transmitted from the FORJ 124 downhole along the optical fiber within the wellbore 106. The FORJ 124 may maintain the optical coupling between the optical fiber 122 and the optical fiber within the conveyance subsystem 104 during ingress and egress of the conveyance subsystem 104 into and out of the wellbore 106.

When the light bursts travel along the optical fiber within the conveyance subsystem 104, an intense electric field of the light beam induces acoustic vibrations due to electrostriction or radiation pressure. The induced acoustic vibrations interact with the incoming light and result in backscattering of the light bursts toward the surface 110. These backscattered light signals may be received and measured by the BOTDS system 120. Based on the magnitude, frequency, and timing of the backscattered light signals, the BOTDS system 120 is able to monitor temperature and optical fiber strain at precise locations along the optical fiber within the wellbore 106. Further, Brillouin scattering events result in backscattered light bursts that are stronger than Raman scattering events (e.g., approximately 20 dB stronger), The Brillouin scattering events are also more sensitive to absolute strain and temperature than Rayleigh scattering events. For example, Rayleigh scattering events exhibit a small dependence on temperature. Thus, the backscattered light signals may be strong enough to traverse the FORJ 124 on a return path to the BOTDS system 120 and sensitive enough to obtain temperature and strain information.

The BOTDS system 120 may be a Brillouin optical time domain reflectometer (BOTDR), or the BOTDS system 120 may be a Brillouin optical time domain analyzer (BOTDA). The BOTDR may use a single optical fiber within the conveyance subsystem 104. The BOTDA may use two optical fibers within the conveyance subsystem 104 to form an optical transmission loop from the surface 110 of the wellbore environment 100 to a total depth of the conveyance subsystem 104 and back to the surface 110. Operation of the BOTDA may be similar to operation of the BOTDR with increased sensitivity. The increased sensitivity may enable the BOTDA to compensate for strain-induced measured temperature variations along the optical fiber within the wellbore 106 more easily than the BOTDR.

When deploying the conveyance subsystem 104 into the wellbore 106 using the deployment system 112, the conveyance subsystem 104 may be run through a gooseneck 126. The gooseneck 126 may guide the conveyance subsystem 104 as it passes from a reel orientation on the reel 114 to a vertical orientation within the wellbore 106. In an example, the gooseneck 126 may be positioned over a wellhead 128 and a blowout preventer 130 using a crane (not shown).

The gooseneck 126 may be mechanically and fluidically attached to an injector 132, and the injector 132 may be mechanically and fluidically attached to a lubricator 134, which is positioned between the injector 132 and the blowout preventer 130. In operation, the injector 132 grips the conveyance subsystem 104 and a hydraulic drive system of the injector 132 provides an injection force on the conveyance subsystem 104 to drive the conveyance subsystem 104 within the wellbore 106. The lubricator 134 may provide an area for staging tools (e.g., the wellbore stimulation tool 108) prior to running the tools downhole within the wellbore 106 when the wellbore 106 represents a high-pressure well. Further, the lubricator 134 provides an area to store the tools during removal of the tools from the high-pressure well. That is, the lubricator 134 provides a staging area for injection and removal of tools into and from a high-pressure well (e.g., a live well).

While the wellbore environment 100 is depicted as using the conveyance subsystem 104 to install the wellbore stimulation tool 108 within the wellbore 106, other tool conveyance systems, as discussed above, may also be employed to deploy other tools within the wellbore 106. For example, the wellbore environment 100 may include a wireline or slickline, which also include an integrated optical fiber, to install the other downhole tools within the wellbore 106. Additionally, while the wellbore environment 100 is depicted as a land based environment, the wellbore environment 100 may also be similarly introduced and operated in a subsea based environment. In an example, the conveyance subsystem 104 may be between 5 km and 30 km (i.e., between approximately 15,000 and 100,000 feet) in length, and the BOTDS system 120 may be able to detect temperature and optical fiber strain along the entire length. In other examples, the conveyance subsystem 104 may be up to 40 km (i.e., approximately 130,000 feet) in length. Further, in an example, the conveyance subsystem 104 may be between 1 inch and 5 inches in diameter.

While the descriptions provided herein are generally directed to a Brillouin backscattering sensor system (e.g., with the BOTDS system 120), other backscattering techniques may also be used through the FORJ 124 at the reel 114. For example, other backscattering sensor systems, such as Coherent Rayleigh and Raman instruments with sufficient light signal strength, may also receive backscattered light through the FORJ 124 to generate temperature profiles from within the wellbore 106. Additionally, strings or linear arrays of low reflectivity Fiber Bragg Gratings or in-situ reflective fiber features may be employed along the conveyance subsystem 104 for quasi-distributed temperature sensing operations, quasi-distributed acoustic sensing operations, and quasi-distributed strain sensing operations. Further, wavelength division multiplexing of various laser interrogation instruments 136 and communications instruments may be simultaneously employed within the optical fiber for multiple wellbore parameter measurements over the individual optical fiber using sufficient optical multiplexing methods.

Figure 2:
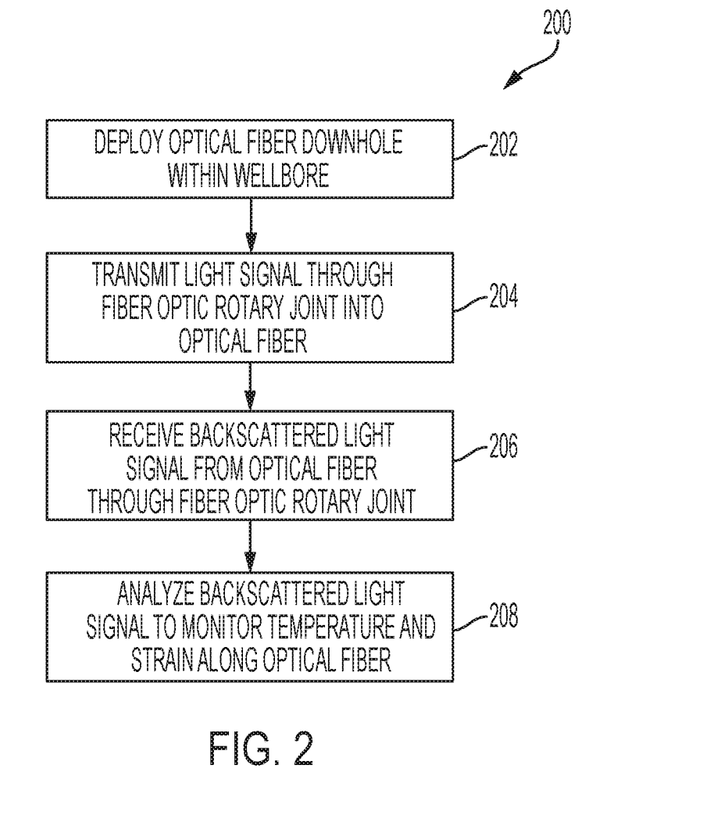
FIG. 2 is a flowchart of a process for monitoring temperature and optical fiber strain within a wellbore according to some aspects of the present disclosure.

FIG. 2 is a flowchart of a process 200 for monitoring temperature and optical fiber strain within the wellbore 106. At block 202, the process 200 involves deploying an optical fiber downhole within the wellbore 106. As discussed above with respect to FIG. 1, the optical fiber may be disposed within the conveyance subsystem 104. The optical fiber may be deployed into or removed from the wellbore 106 by rotating the reel 114. Further, the optical fiber may remain optically coupled to the BOTDS system 120 through the FORJ 124 even during rotation of the reel 114.

At block 204, the process 200 involves transmitting light signals through the FORJ 124 into the optical fiber. The light signals may be transmitted as short light bursts by the BOTDS system 120, In another example, the light signals may be transmitted as continuous light signals or longer and relatively weaker light bursts across the FORJ 124. Further, the light signals may be transmitted into the optical fiber while the optical fiber is run into the wellbore 106, while the optical fiber is stationary within the wellbore 106, while the optical fiber is being removed from the wellbore 106, or any combination thereof.

At block 206, the process 200 involves receiving backscattered light signals from the optical fiber at the BOTDS system 120 through the FORJ 124. Interactions with stimulated phonons in the optical fiber due to temperature or optical fiber strain may result in the backscatter of the light bursts toward the surface 110 of the wellbore 106. These backscattered light signals may be received and measured by the BOTDS system 120. Because the BOTDS system 120 interrogates Brillouin backscattering events, the light received from the optical fiber may be stronger than those in Raman scattering operations and more sensitive to temperature and absolute strain than those in Rayleigh scattering. Accordingly, the backscattered light signals may also be strong enough to traverse the FORJ 124 on a return path to the BOTDS system 120 while being able to interrogate temperature and absolute strain more accurately.

At block 208, the process 200 involves analyzing the backscattered light signal received at the BOTDS system 120 to monitor temperature and optical strain along the optical fiber. Based on the magnitude, frequency, and timing of the backscattered light signals, the BOTDS system 120 is able to monitor temperature and optical fiber strain at precise locations along the optical fiber within the wellbore 106. Analysis of the backscattered light signal may occur during other downhole operations performed by any downhole tools within the wellbore 106 or during communication between the downhole tools and surface equipment using optical, electrical, acoustic, or pressure based communication techniques. For example, the BOTDS system 120 may receive and analyze the backscattered light signal while the wellbore stimulation tool 108 performs a stimulation operation within the wellbore 106, such as a hydraulic fracturing operation.

Further, the BOTDS system 120 may include a temporal filtering system. The temporal filtering system may provide a mechanism that separates temperature measurements and strain measurements. For example, an optical fiber strain profile of the optical fiber may remain sufficiently uniform during a data acquisition scan making the temporal filtering system able to filter out the effects of optical strain on the backscattered light signals. Additionally, changes to the temperature within the wellbore 106 and detected by the optical fiber occur slowly enough in comparison to the optical fiber strain profile that the temporal filtering system is also able to isolate and extract a temperature profile from the optical strain profile.

Figure 3:
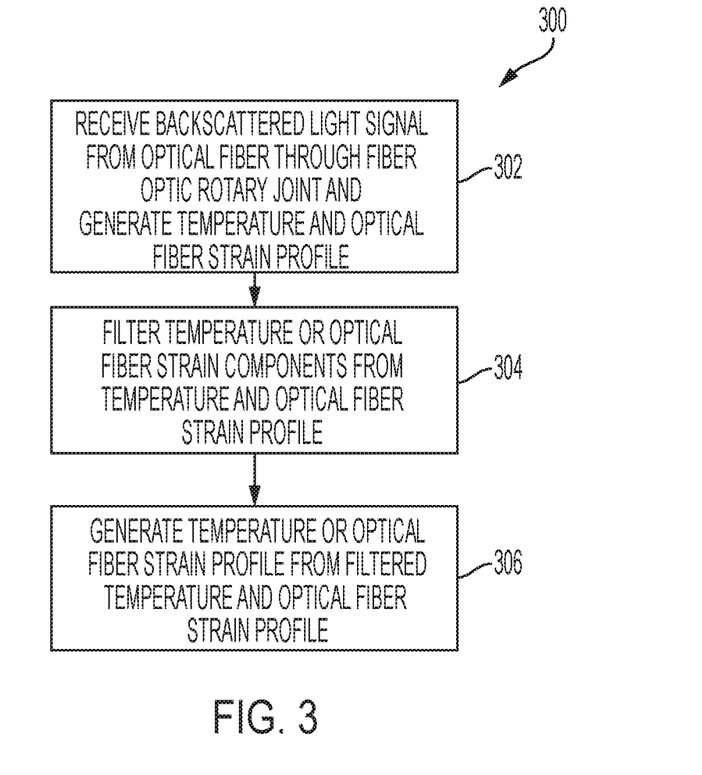
FIG. 3 is a flowchart of a process for correcting temperature or strain measurements based on backscattered light signals received from within a wellbore according to some aspects of the present disclosure.

FIG. 3 is a flowchart of a process 300 for correcting temperature or strain measurements based on backscattered light signals received from within the wellbore 106. As discussed above, a temporal filtering system of the BOTDS system 120 may be able to distinguish between effects of optical fiber strain components and temperature components of the backscattered light signals based on the speed of change of the components. At block 302, the process 300 involves receiving the backscattered light signals from the optical fiber at the BOTDS system 120 through the FORJ 124 and generating a temperature and optical fiber strain profile based on the backscattered light signals. As discussed above, the power of the light signals provided by the BOTDS system 120 using Brillouin scattering may be sufficient for the backscattered light signals to traverse the FORJ 124 with sufficient signal strength for the BOTDS system 120 to analyze the backscattered light signals.

At block 304, the process 300 involves filtering, by the BOTDS system 120, the temperature or optical fiber strain components from the temperature and optical fiber strain profile. The BOTDS system 120 may use a temporal filtering system to filter the components to isolate a temperature profile or an optical fiber strain profile. In an example, the temporal filtering system may filter the temperature components or the optical fiber strain components by analyzing the speed at which the temperature and optical fiber strain profile changes along a length of the optical fiber. For example, if the BOTDS system 120 is isolating the temperature along the length of the optical fiber, the temporal filtering system may filter out changes that occur quickly due to the slow changing nature of the temperature. Likewise, if the BOTDS system 120 is isolating the optical fiber strain along the length of the optical fiber, the temporal filtering system may filter out changes that occur slowly due to the relatively fast changes indicated in the temperature and optical fiber strain profile resulting from optical fiber strain.

At block 306, the process 300 involves generating temperature or optical fiber strain profiles from the filtered temperature and optical fiber strain profile. By isolating the temperature along the optical fiber or the optical fiber strain along the optical fiber, the resulting profile may be of only the temperature or of only the optical fiber strain. In one or more examples, the BOTDS system 120 may generate both the temperature profile and the optical strain profile along the optical fiber.

Figure 4:
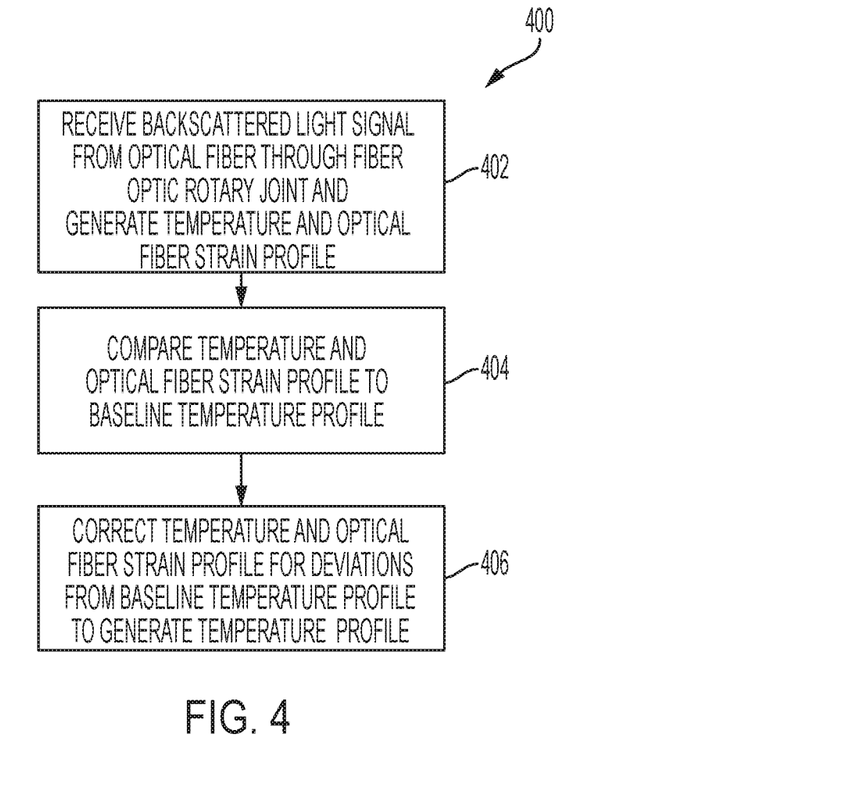
FIG. 4 is a flowchart of a process for correcting temperature measurements based on a backscattered light signal received from within a wellbore according to some aspects of the present disclosure.

FIG. 4 is a flowchart of a process 400 for correcting temperature measurements based on backscattered light signals received from within the wellbore 106. As discussed above, a temporal filtering system of the BOTDS system 120 may be able to distinguish between effects of the optical fiber strain component and the temperature component of the backscattered light signals based on the speed of change of the components. In an additional example, the process 400 removes the optical strain component of the temperature and optical fiber strain profile generated by the BOTDS system 120 by comparing the backscattered light signal to a baseline temperature profile and correcting portions of the backscattered light signal that depart from the baseline temperature profile. Accordingly, at block 402, the process 400 involves receiving the backscattered light signals from the optical fiber at the BOTDS system 120 through the FORJ 124 and generating a temperature and optical fiber strain profile based on the backscattered light signals. As discussed above, the power of the light signals provided by the BOTDS system 120 using Brillouin scattering may be sufficient for the backscattered light signals to traverse the FORJ 124 with sufficient signal strength for the BOTDS system 120 to analyze the backscattered light signals.

At block 404, the process 400 involves comparing, by the BOTDS system 120, the temperature and optical fiber strain profile to a baseline temperature profile. The baseline temperature profile may include a general shape that a wellbore temperature is expected to follow as the optical fiber extends from the surface 110 of the wellbore 106 into the wellbore 106. Any differences between the baseline temperature profile and the temperature and optical fiber strain profile may be attributable to the optical fiber strain characteristics.

At block 406, the process 400 involves correcting the temperature and optical fiber strain profile for deviations from the baseline temperature profile to generate a temperature profile of the wellbore 106. By removing the deviations from the temperature and optical fiber strain profile from the shape of the baseline temperature profile, the optical fiber strain effects on the temperature and optical fiber strain profile are isolated and removed. Accordingly, the resulting temperature profile is based on the measured temperature along the optical fiber disposed within the wellbore 106.

Figure 5:
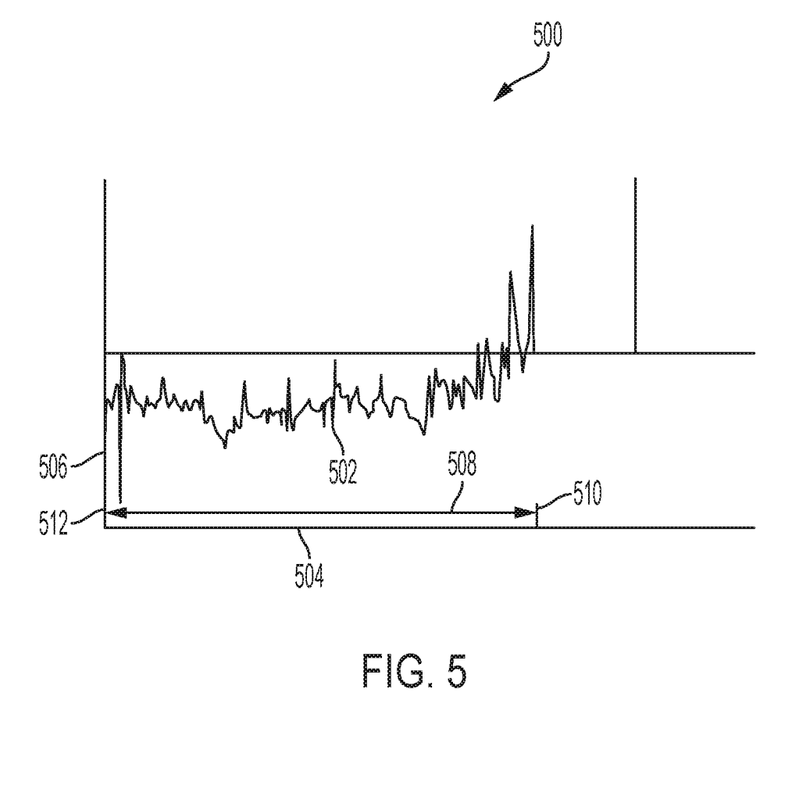
FIG. 5 is a chart depicting a temperature and optical fiber strain profile of an optical fiber at a surface of a wellbore of the wellbore environment of FIG. 1 according to some aspects of the present disclosure.

FIG. 5 is a chart 500 depicting a temperature and optical fiber strain profile 502 of an optical fiber at the surface 110 of the wellbore 106 of the wellbore environment 100. As illustrated, an abscissa 504 represents a length of the optical fiber. Further, an ordinate 506 represents a strain measurement along the optical fiber that is represented by the temperature and optical fiber strain profile 502. In some examples, the ordinate 506 may represent a temperature measurement. In other examples, the ordinate 506 may represent a frequency of the backscattered light pulses. In an example, the strain measurement may be a change in length of the optical fiber over the entire length of the optical fiber, as measured by the BOTDS system 120 using the backscattered light signals received at the BOTDS system 120. Within the optical fiber, there is a strong relationship between the frequency of the Brillouin backscattered light as depicted as a strain experienced by the optical fiber and temperature. For example, even though displayed as a strain, the temperature may be a significant contributor to the temperature and optical fiber strain profile 502 representative of the Brillouin backscattered light generated by the optical fiber. Accordingly, the temperature and optical fiber strain profile 502 provides a combined representation of a temperature component and an optical fiber strain component acting on the optical fiber. As discussed above, these components may be isolated to provide a temperature profile along the optical fiber or an optical fiber strain profile along the optical fiber.

As depicted in FIG. 5, the temperature, represented by the temperature and optical fiber strain profile 502, may increase along a length 508 of the optical fiber. In an example, this increase in temperature may be due to an optical fiber portion at an end 510 being at the surface (e.g., an outer layer) of the reel 114, while an optical fiber portion at an end 512 may have layers of the optical fiber (e.g., within the conveyance subsystem 104) providing insulation. Additionally, strain on the optical fiber due to the optical fiber exiting the reel 114 may also provide an increase in the strain at the end 510 of the optical fiber, as depicted in the temperature and optical fiber strain profile 502.

Figure 6:
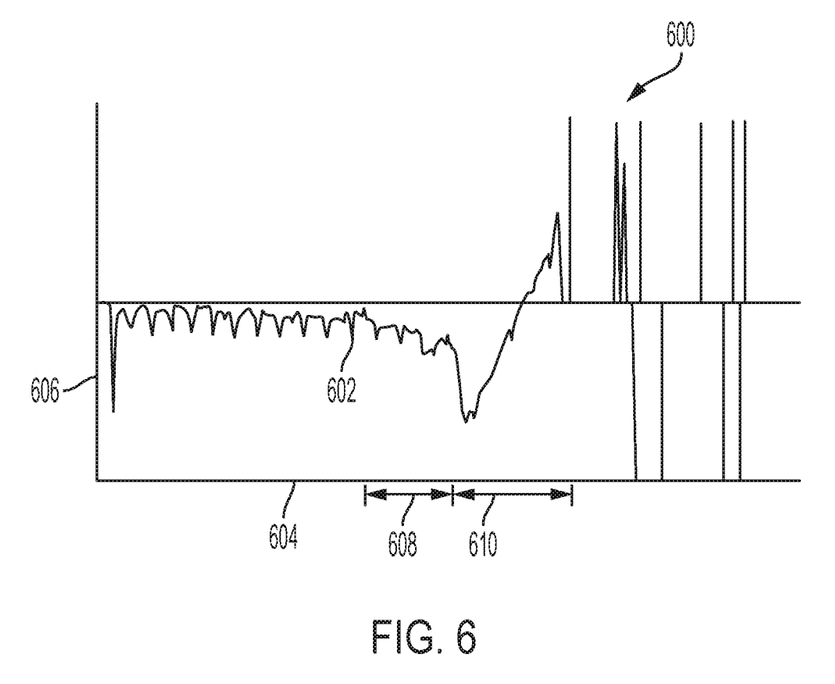
FIG. 6 is a chart depicting a temperature and optical fiber strain profile of an optical fiber at a total depth of a wellbore of the wellbore environment of FIG. 1 according to some aspects of the present disclosure.

FIG. 6 is a chart 600 depicting a temperature and optical fiber strain profile 602 of an optical fiber at a total depth of the wellbore 106 of the wellbore environment 100. As illustrated, an abscissa 604 represents a length of the optical fiber. Further, an ordinate 606 represents a strain measurement along the optical fiber that is represented by the temperature and optical fiber strain profile 602. In some examples, the ordinate 606 may represent a temperature measurement. In other examples, the ordinate 606 may represent a frequency of the backscattered light pulses. As discussed above with respect to FIG. 5, the strain measurement may be represented by a change in length of the optical fiber over the entire length of the optical fiber. Within the optical fiber, there is a strong relationship between the frequency of the Brillouin backscattered light as depicted as a strain experienced by the optical fiber and temperature. For example, even though displayed as a strain, the temperature may be a significant contributor to the temperature and strain profile 602 representative of the Brillouin backscattered light generated by the optical fiber. Accordingly, the temperature and optical fiber strain profile 602 provides a combined representation of a temperature component and an optical fiber strain component acting on the optical fiber. As discussed above, these components may be isolated to provide a temperature profile along the optical fiber or an optical fiber strain profile along the optical fiber.

As depicted in FIG. 6, the temperature, represented by the temperature and optical fiber strain profile 602, may initially decrease gradually along a length 608 of the optical fiber as the optical fiber leaves the reel 114 and traverses the gooseneck 126 prior to insertion within the wellbore 106. Upon entering the wellbore 106, the optical fiber along a length 610 may quickly cool as the optical fiber enters the wellbore 106 and gradually heat up to reflect temperature changes in the wellbore 106 as the optical fiber extends deeper within the wellbore 106.

Figure 7:
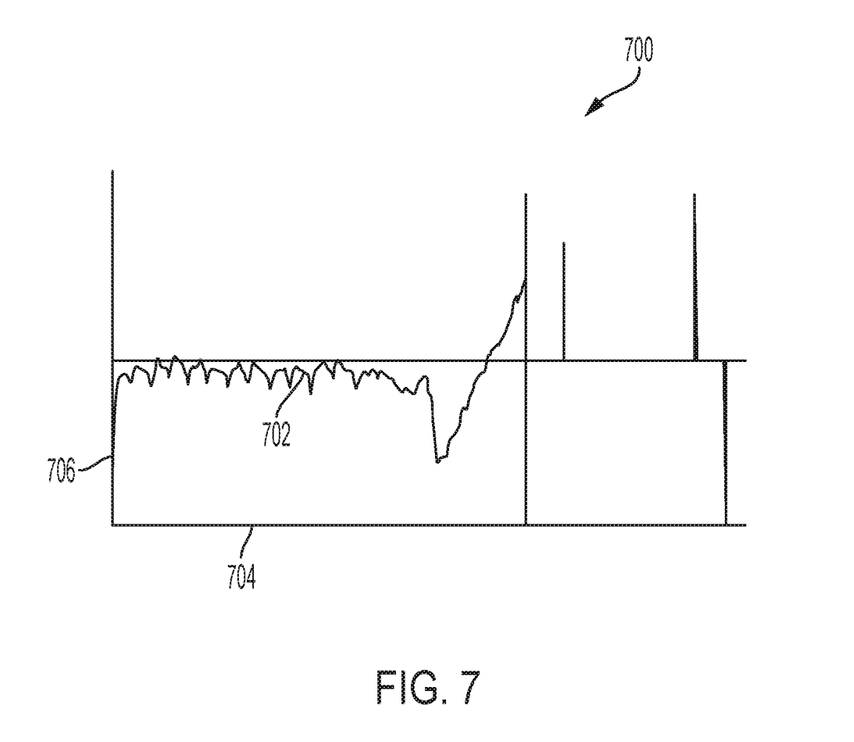
FIG. 7 is a chart depicting a temperature and optical fiber strain profile of an optical fiber at total depth of a wellbore of the wellbore environment of FIG. 1 after reaching thermal equilibrium according to some aspects of the present disclosure.

FIG. 7 is a chart 700 depicting a temperature and optical fiber strain profile 702 of the optical fiber at total depth of the wellbore 106 of the wellbore environment 100 after reaching thermal equilibrium. As illustrated, an abscissa 704 represents a length of the optical fiber. Further, an ordinate 706 represents a strain measurement along the optical fiber that is represented by the temperature and optical fiber strain profile 702. In some examples, the ordinate 706 may represent a temperature measurement. In other examples, the ordinate 706 may represent a frequency of the backscattered light pulses. The temperature, represented by the temperature and optical fiber strain profile 702, may reach equilibrium within the wellbore after the optical fiber remains stationary for multiple hours. At equilibrium, the measured strain indicated in the temperature and optical fiber strain profile 702 may all be attributable to the temperature component because the strain on the optical fiber within the wellbore 106 after reaching equilibrium is unchanging.

As indicated by the similarity between FIGS. 6 and 7, measurements taken immediately after reaching the total depth of the wellbore 106 (or a total depth of the optical fiber) may be sufficiently similar to equilibrium temperature measurements such that the optical fiber is able to detect accurate information about the wellbore 106 even without reaching the temperature equilibrium. Further, the temperature and optical fiber strain measurements taken while the optical fiber is run into or out of the wellbore 106 may similarly provide accurate information to determine temperature and optical fiber strain. In one or more examples, the temperature and optical fiber strain measurements may also be taken while other downhole operations are being performed (e.g., wellbore stimulation, wellbore logging operations, perforating operations, etc.).

Figure 8:
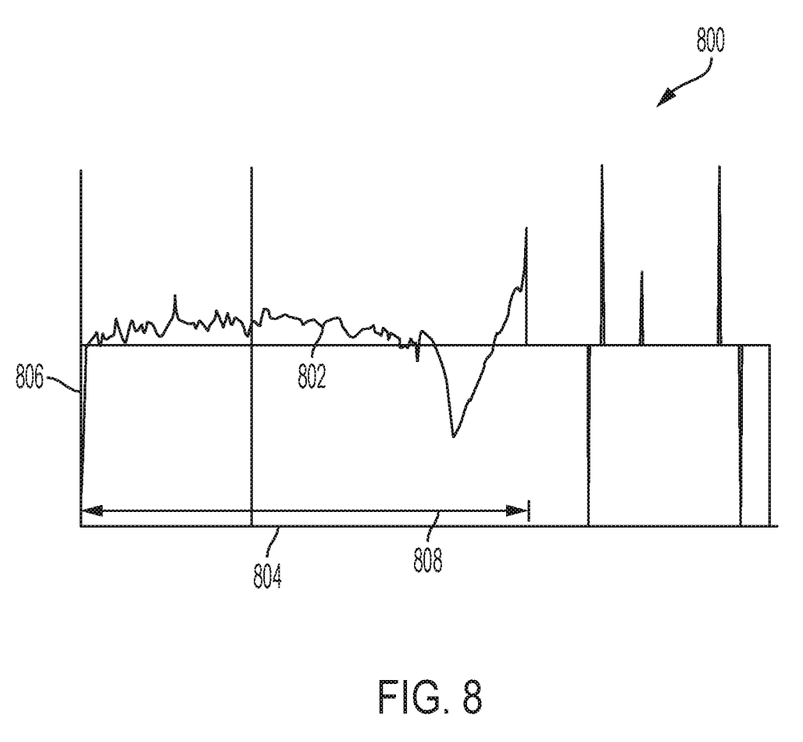
FIG. 8 is a chart depicting a temperature and optical fiber strain profile of an optical fiber while the optical fiber is being removed from a wellbore of the wellbore environment of FIG. 1 according to some aspects of the present disclosure.

FIG. 8 is a chart 800 depicting a temperature and optical fiber strain profile 802 of an optical fiber while the optical fiber is being removed from the wellbore 106 of the wellbore environment 100. As illustrated, an abscissa 804 represents a length of the optical fiber. Further, an ordinate 806 represents a strain measurement along the optical fiber that is representative of the temperature and optical fiber strain profile 802. The temperature, represented by the temperature and optical fiber strain profile 802, may still be accurately observed along a length 808 of the optical fiber as the optical fiber is reeled back to the reel 114 during removal from the wellbore 106.

Figure 9:
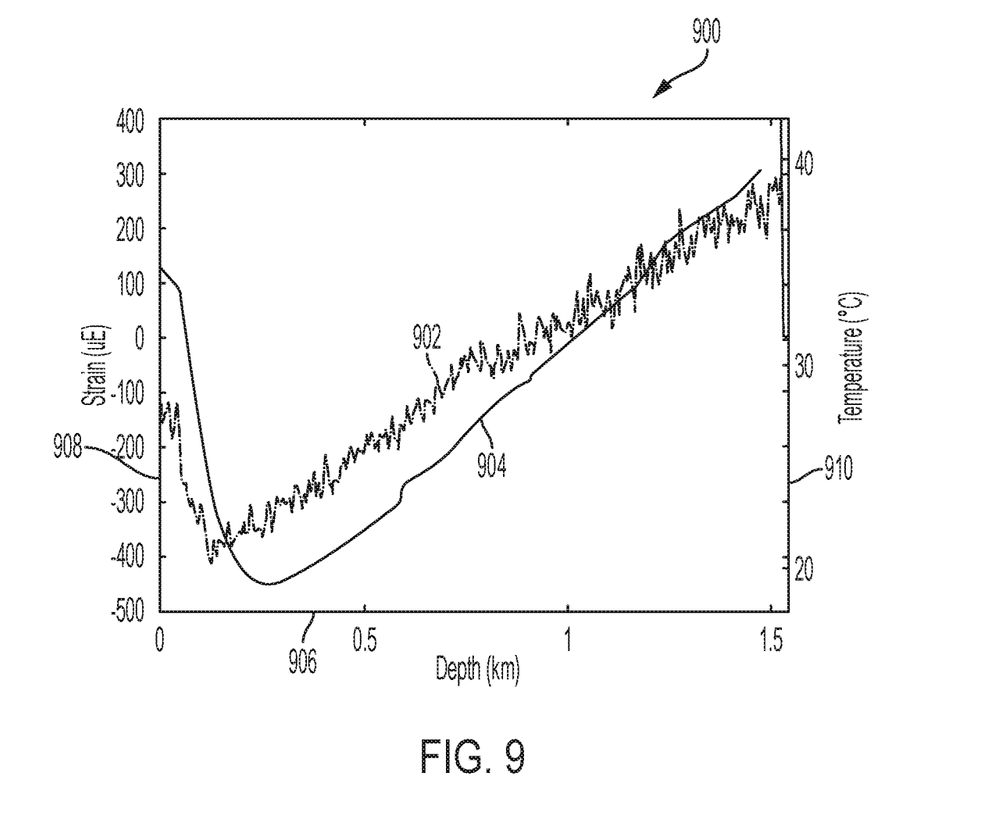
FIG. 9 is a chart depicting geothermal profiles of a wellbore of the wellbore environment of FIG. 1 using an optical fiber and a point temperature sensor according to some aspects of the present disclosure.

FIG. 9 is a chart 900 depicting two geothermal profiles 902 and 904 of the wellbore 106 of the wellbore environment 100 using measurements from the optical fiber (e.g., with the geothermal profile 902) and measurements from a point temperature sensor (e.g., with the geothermal profile 904). As illustrated, an abscissa 906 represents a depth of the measurement within the wellbore 106. Further, a first ordinate 908 represents a strain measurement along the optical fiber that is represented by the geothermal profile 902. A second ordinate 910 represents a temperature reading by the point temperature sensor that is represented by the geothermal profile 904. The differences between the geothermal profiles 902 and 904 shows that the temperatures read by the point temperature sensor, and represented by the geothermal profile 904, lag behind the strain measurements represented by the geothermal profile 902. This lag may be the result of thermal inertia where the point temperature sensor has a slow heating effect due to a relatively large tool mass, thermal conductivity, and heat capacity. The inertial lag may effectively provide a low filter response to the measurements indicated by the geothermal profile 904 as the tool is advanced to the total depth within the wellbore 106. With slope calibration (e.g., through the temporal filter system of the process 300 or the baseline fitting process 400), the geothermal profile 902 may be smoothed of internal fiber strain variations to also provide a filtered response with greater accuracy. Further, because of the thermal inertia of the point temperature sensor, the point temperature sensor may be deployed within the wellbore 106 at a much slower rate than optical fiber to provide similar accuracy of the temperature measurements as the optical fiber measurements.

In some aspects, systems, devices, and methods for monitoring temperature and optical fiber strain within a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system, comprising: an optical fiber integrated into a conveyance subsystem that is positionable downhole in a wellbore: a backscattering sensor system positionable to monitor temperature and optical fiber strain along the optical fiber using backscattered light signals received from the optical fiber; and a fiber optic rotary joint positionable to optically couple the optical fiber with the backscattering sensor system to provide an optical path for the backscattered light signals to reach the backscattering sensor system.

Example 2 is the system of example 1, further comprising a reel positionable to store at least a portion of the conveyance subsystem during deployment of the conveyance subsystem downhole within the wellbore.

Example 3 is the system of examples 1-2, wherein the backscattering sensor system is positionable to monitor the temperature and the optical fiber strain along the optical fiber while the conveyance subsystem is deployed into or removed from the wellbore.

Example 4 is the system of examples 1-3, further comprising: a downhole tool attached to a downhole end of the conveyance subsystem, wherein the backscattering sensor system is positionable to monitor the temperature and the optical fiber strain along the optical fiber during operation of the downhole tool.

Example 5 is the system of example 4, wherein the downhole tool comprises a wireline logging tool, a perforating tool, a wellbore completion tool, a telemetry tool, or a combination thereof.

Example 6 is the system of examples 1-5, wherein the optical fiber is positionable to receive wavelength division multiplexed light signals from additional laser interrogation instruments, communications instruments, or both while the sensor monitors temperature and optical fiber strain along the optical fiber.

Example 7 is the system of examples 1-6, wherein the backscattering sensor system comprises a Brillouin optical time domain sensor system, a coherent Rayleigh instrument, or a Raman instrument, and wherein the backscattering sensor system is positionable to monitor the temperature and the optical fiber strain along an entire length of the optical fiber.

Example 8 is the system of examples 1-7, further comprising: a temporal filtering system positionable to separate temperature components and optical fiber strain components from a temperature and optical fiber strain profile generated by the backscattering sensor system.

Example 9 is a method, comprising: deploying an optical fiber downhole within a wellbore; transmitting, by a Brillouin optical time domain sensor system, a light signal through a fiber optic rotary joint into the optical fiber; receiving, by the Brillouin optical time domain sensor system, a backscattered light signal from the optical fiber through the fiber optic rotary joint; and analyzing, by the Brillouin optical time domain sensor system, the backscattered light signal to monitor temperature and optical fiber strain along the optical fiber.

Example 10 is the method of example 9, wherein transmitting the light signal through the fiber optic rotary joint into the optical fiber is performed while the optical fiber is run into or out of the wellbore.

Example 11 is the method of examples 9-10, wherein analyzing the backscattered light signal to monitor the temperature comprises filtering out a strain component from the backscattered light signal, and analyzing the backscattered light signal to monitor the optical fiber strain comprises filtering out a temperature component from the backscattered light signal.

Example 12 is the method of examples 9-11, wherein analyzing the backscattered light signal to monitor the temperature comprises removing an optical fiber strain component of the backscattered light signal by comparing a temperature and optical fiber strain profile generated using the backscattered light signal to a baseline temperature profile and correcting portions of the temperature and optical fiber strain profile that depart from the baseline temperature profile.

Example 13 is the method of examples 9-12, wherein receiving the backscattered light signal is performed while a downhole tool performs a downhole operation within the wellbore.

Example 14 is the method of examples 9-13, wherein receiving the backscattered light signal is performed during a wellbore stimulation operation.

Example 15 is the method of examples 9-14, wherein deploying the optical fiber within the wellbore is performed by rotating a reel coupled to the fiber optic rotary joint and storing undeployed portions of the optical fiber.

Example 16 is a downhole optical fiber sensing system, comprising: an optical fiber positionable downhole within a wellbore; a Brillouin optical time domain sensor system positionable to monitor temperature and optical fiber strain along the optical fiber using backscattered light signals received from the optical fiber while running the optical fiber into or out of the wellbore; and a fiber optic rotary joint positionable to optically couple the optical fiber with the Brillouin optical time domain sensor system to provide an optical path for the backscattered light signals to reach the Brillouin optical time domain sensor system.

Example 17 is the system of example 16, wherein the optical fiber is integrated into a coiled tubing, a wireline, or a slickline.

Example 18 is the system of examples 16-17, further comprising a reel positionable to store at least a portion of the optical fiber during deployment of the optical fiber downhole within the wellbore.

Example 19 is the system of examples 16-18, wherein the Brillouin optical time domain sensor system is positionable to monitor the temperature and the optical fiber strain along the optical fiber simultaneously.

Example 20 is the system of examples 16-19, wherein the optical fiber comprises a length of between 10 km and 40 km, and wherein the Brillouin optical time domain sensor system is positionable to monitor the temperature and strain along the length of the optical fiber.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
an optical fiber integrated into a conveyance subsystem that is positionable downhole in a wellbore;
a backscattering sensor system positionable to monitor temperature and optical fiber strain along the optical fiber using backscattered light signals received from the optical fiber;
a fiber optic rotary joint positionable to optically couple the optical fiber with the backscattering sensor system to provide an optical path for the backscattered light signals to reach the backscattering sensor system; and
a temporal filtering system positionable to separate temperature components and optical fiber strain components from a temperature and optical fiber strain profile using a rate of change of the temperature components and the optical fiber strain components of the temperature and optical fiber strain profile generated by the backscattering sensor system.

2. The system of claim 1, further comprising a reel positionable to store at least a portion of the conveyance subsystem during deployment of the conveyance subsystem downhole within the wellbore.

3. The system of claim 1, wherein the backscattering sensor system is positionable to monitor the temperature and the optical fiber strain along the optical fiber while the conveyance subsystem is deployed into or removed from the wellbore.

4. The system of claim 1, wherein the optical fiber is positionable to receive wavelength division multiplexed light signals from additional laser interrogation instruments while the backscattering sensor system monitors temperature and optical fiber strain along the optical fiber.

5. The system of claim 1, wherein the backscattering sensor system comprises a Brillouin optical time domain sensor system, a coherent Rayleigh instrument, or a Raman instrument, and wherein the backscattering sensor system is positionable to monitor the temperature and the optical fiber strain along an entire length of the optical fiber.

6. The system of claim 1, further comprising:
a downhole tool attached to a downhole end of the conveyance subsystem, wherein the backscattering sensor system is positionable to monitor the temperature and the optical fiber strain along the optical fiber during operation of the downhole tool.

7. The system of claim 6, wherein the downhole tool comprises a wireline logging tool, a perforating tool, a wellbore completion tool, a telemetry tool, or a combination thereof.

8. A method, comprising:
deploying an optical fiber downhole within a wellbore;
transmitting, by a Brillouin optical time domain sensor system, a light signal through a fiber optic rotary joint into the optical fiber;
receiving, by the Brillouin optical time domain sensor system, a backscattered light signal from the optical fiber through the fiber optic rotary joint;
analyzing, by the Brillouin optical time domain sensor system, the backscattered light signal to monitor temperature and optical fiber strain along the optical fiber; and
separating, by a temporal filtering system, temperature components and optical fiber strain components from a temperature and optical fiber strain profile using a rate of change of the temperature components and the optical fiber strain components of the temperature and optical fiber strain profile generated by the Brillouin optical time domain sensor system.

9. The method of claim 8, wherein transmitting the light signal through the fiber optic rotary joint into the optical fiber is performed while the optical fiber is run into or out of the wellbore.

10. The method of claim 8, wherein analyzing the backscattered light signal to monitor the temperature comprises filtering out a strain component from the backscattered light signal, and analyzing the backscattered light signal to monitor the optical fiber strain comprises filtering out a temperature component from the backscattered light signal.

11. The method of claim 8, wherein analyzing the backscattered light signal to monitor the temperature comprises removing an optical fiber strain component of the backscattered light signal by comparing a temperature and optical fiber strain profile generated using the backscattered light signal to a baseline temperature profile and correcting portions of the temperature and optical fiber strain profile that depart from the baseline temperature profile.

12. The method of claim 8, wherein receiving the backscattered light signal is performed while a downhole tool performs a downhole operation within the wellbore.

13. The method of claim 8, wherein receiving the backscattered light signal is performed during a wellbore stimulation operation.

14. The method of claim 8, wherein deploying the optical fiber within the wellbore is performed by rotating a reel coupled to the fiber optic rotary joint and storing undeployed portions of the optical fiber.

15. A downhole optical fiber sensing system, comprising:
an optical fiber positionable downhole within a wellbore;
a Brillouin optical time domain sensor system positionable to monitor temperature and optical fiber strain along the optical fiber using backscattered light signals received from the optical fiber while running the optical fiber into or out of the wellbore;
a fiber optic rotary joint positionable to optically couple the optical fiber with the Brillouin optical time domain sensor system to provide an optical path for the backscattered light signals to reach the Brillouin optical time domain sensor system; and
a temporal filtering system positionable to separate temperature components and optical fiber strain components from a temperature and optical fiber strain profile using a rate of change of the temperature components and the optical fiber strain components of the temperature and optical fiber strain profile generated by the Brillouin optical time domain sensor system.

16. The system of claim 15, wherein the optical fiber is integrated into a coiled tubing, a wireline, or a slickline.

17. The system of claim 15, further comprising a reel positionable to store at least a portion of the optical fiber during deployment of the optical fiber downhole within the wellbore.

18. The system of claim 15, wherein the Brillouin optical time domain sensor system is positionable to monitor the temperature and the optical fiber strain along the optical fiber simultaneously.

19. The system of claim 15, wherein the optical fiber comprises a length of between 10 km and 40 km, and wherein the Brillouin optical time domain sensor system is positionable to monitor the temperature and strain along the length of the optical fiber.

\* \* \* \* \*